United States Patent
Kamiya et al.

(10) Patent No.: US 11,897,458 B2
(45) Date of Patent: Feb. 13, 2024

(54) COLLISION AVOIDANCE APPARATUS FOR VEHICLE

(71) Applicant: DENSO CORPORATION, Kariya (JP)

(72) Inventors: Kei Kamiya, Kariya (JP); Yosuke Ito, Kariya (JP); Toru Takahashi, Kariya (JP); Shogo Matsunaga, Kariya (JP); Takaharu Oguri, Kariya (JP); Takahiro Baba, Kariya (JP); Ryo Takaki, Kariya (JP)

(73) Assignee: DENSO CORPORATION, Kariya (JP)

( * ) Notice: Subject to any disclaimer, the term of this patent is extended or adjusted under 35 U.S.C. 154(b) by 424 days.

(21) Appl. No.: 17/077,767

(22) Filed: Oct. 22, 2020

(65) Prior Publication Data

US 2021/0039636 A1 Feb. 11, 2021

Related U.S. Application Data

(63) Continuation of application No. PCT/JP2019/006570, filed on Feb. 21, 2019.

(30) Foreign Application Priority Data

Apr. 24, 2018 (JP) .................................. 2018-082676

(51) Int. Cl.
*B60W 30/09* (2012.01)
*B60W 10/18* (2012.01)
(Continued)

(52) U.S. Cl.
CPC ............ *B60W 30/09* (2013.01); *B60W 10/18* (2013.01); *B60W 30/0953* (2013.01);
(Continued)

(58) Field of Classification Search
CPC .. B60W 30/09; B60W 10/18; B60W 30/0953; B60W 40/04; B60W 40/105;
(Continued)

(56) References Cited

U.S. PATENT DOCUMENTS 10,486,708 B1 * 11/2019 Chan ................... B60W 60/001
2010/0030474 A1 2/2010 Sawada
(Continued)

FOREIGN PATENT DOCUMENTS

FR 3052418 A1 * 12/2017 ............ B60W 30/09
JP 2002-140799 A 5/2002
(Continued)

*Primary Examiner* — Harry Y Oh
(74) *Attorney, Agent, or Firm* — MASCHOFF BRENNAN (57) ABSTRACT

In a collision avoidance apparatus for a vehicle, a collision avoidance controller is configured to calculate a movement trajectory of a moving object moving on a road crossing a road that the vehicle is traveling on from a succession of locations of the moving object, calculate a movement trajectory of the vehicle using a speed of the vehicle, determine whether the movement trajectory of the moving object is a trajectory of a moving object likely colliding with the vehicle, and in response to determining that the movement trajectory of the moving object is a trajectory of a moving object likely colliding with the vehicle and that the moving object fails to be recognized by a camera due to a view of the moving object being obstructed, calculate a risk index for determining a collision avoidance measure and employ the collision avoidance measure in dependence upon the risk index.

14 Claims, 6 Drawing Sheets

(51) Int. Cl.
*B60W 30/095* (2012.01)
*G06V 20/58* (2022.01)
*G06T 7/70* (2017.01)
*B60W 40/04* (2006.01)
*B60W 40/105* (2012.01)

(52) U.S. Cl.
CPC ......... *B60W 40/04* (2013.01); *B60W 40/105* (2013.01); *G06T 7/70* (2017.01); *G06V 20/58* (2022.01); *G06V 20/584* (2022.01); *B60W 2420/52* (2013.01); *B60W 2554/80* (2020.02); *B60W 2556/45* (2020.02); *G06T 2207/30236* (2013.01); *G06T 2207/30241* (2013.01); *G06T 2207/30261* (2013.01)

(58) Field of Classification Search
CPC ......... B60W 2420/52; B60W 2554/80; B60W 2556/45; B60W 2520/10; B60W 2555/60; B60W 30/095; B60W 30/18154; G06T 7/70; G06T 2207/30236; G06T 2207/30241; G06T 2207/30261; G06T 7/20; G06V 20/58; G06V 20/584; B60T 2201/022; B60T 7/22; G08G 1/09; G08G 1/16
See application file for complete search history.

(56) References Cited

U.S. PATENT DOCUMENTS

| | | | | |
|---|---|---|---|---|
| 2012/0287276 | A1* | 11/2012 | Dwivedi | G06V 20/584 348/148 |
| 2013/0181823 | A1* | 7/2013 | Stahlin | B60Q 9/008 340/436 |
| 2016/0161270 | A1* | 6/2016 | Okumura | G08G 1/096725 701/23 |
| 2016/0167652 | A1* | 6/2016 | Slusar | B60W 50/082 701/27 |
| 2017/0349168 | A1* | 12/2017 | Meinhart | B60W 30/095 |
| 2018/0211528 | A1* | 7/2018 | Seifert | G06V 20/56 |
| 2019/0039610 | A1* | 2/2019 | Mukai | G06V 20/58 |

FOREIGN PATENT DOCUMENTS

| | | |
|---|---|---|
| JP | 2007-241729 A | 9/2007 |
| JP | 2010-191604 A | 9/2010 |
| JP | 2010-237063 A | 10/2010 |
| JP | 2017-224026 A | 12/2017 |

* cited by examiner

COLLISION AVOIDANCE APPARATUS FOR VEHICLE

CROSS-REFERENCE TO RELATED APPLICATION

This application is based on and claims the benefit of priority from earlier Japanese Patent Application No. 2018-082676 filed on Apr. 24, 2018, the description of which is incorporated herein by reference.

BACKGROUND

Technical Field

The present disclosure relates to a collision avoidance apparatus.

Related Art

In recent years, various techniques have been developed to avoid a collision between moving objects, such as vehicles. For example, a first disclosed technique predicts the presence or absence of occurrence of a collision by means of a probabilistic measure using sensor information or the like transmitted from sensors installed along a road, pre-emptively determines a probability of occurrence of a collision between vehicles coming from different directions based on a relationship between expected times of arrival of the respective vehicles, and provides a warning to a driver of the own vehicle or directly controls the own vehicle, thereby slowing or stopping the own vehicle. A second disclosed technique relates to the case of the own vehicle being an emergency vehicle.

DESCRIPTION OF SPECIFIC EMBODIMENTS

As a result of detailed research performed by the present inventors, regarding the first technique, as disclosed in JP-A-2002-140799, and the second technique, as disclosed in JP-A-2010-191604, some issues have been found. For example, in a situation where a target vehicle determined to be likely to collide with the own vehicle is invisible due to the view of the target vehicle being obstructed by barriers or buildings, controlling the own vehicle based only on information received via communications or the like may become an unnecessary operation. In addition, controlling the own vehicle in such a situation may be unexpected to occupants of the own vehicle or a following vehicle. However, to avoid a collision or the like, a control operation, such as rapid braking, may be needed, even if unexpected.

In view of the foregoing, it is desired to have a technique for avoiding a collision between an own vehicle and a moving object, enabling mitigation of a risk of an unexpected control operation of the own vehicle and a risk of a rear end collision caused by such an unexpected control operation.

Hereinafter, exemplary embodiments of the present disclosure will be described in detail with reference to the accompanying drawings, in which like reference numerals refer to like or similar elements regardless of reference numerals and duplicated description thereof will be omitted.

Figure 1:
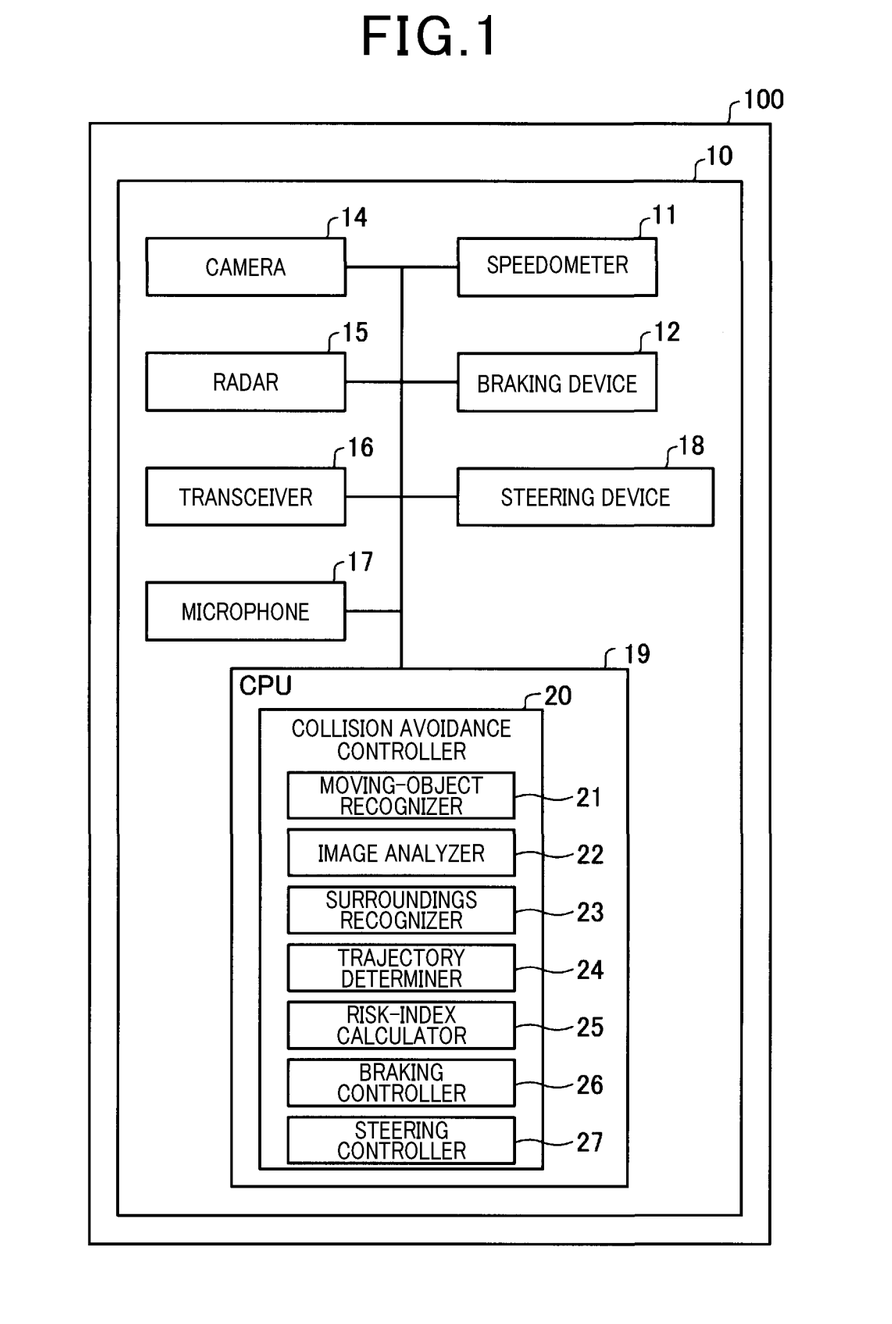
FIG. 1 is a schematic block diagram of an own vehicle including a collision avoidance apparatus according to one embodiment.

One embodiment of the present disclosure will now be described with reference to FIG. 1. FIG. 1 is a schematic diagram of a collision avoidance apparatus 10 mounted to an own vehicle 100. The term "own vehicle" as used herein refers to a vehicle equipped with the collision avoidance apparatus 10. The collision avoidance apparatus 10 includes a speedometer 11, a braking device 12, a camera 14, a radar 15, a transceiver 16, a microphone 17, a steering device 18, and a central processing unit (CPU) 19.

The speedometer 11 is included in a speed acquirer configured to acquire a speed of the own vehicle 100. The speedometer 11 acquires a speed of the own vehicle 100 based on a rotational speed of a wheel or a differential gear. In an alternative embodiment where the speed acquirer includes a navigation unit as well as the speedometer 11, the speed acquirer may acquire a location of the own vehicle 100 from the navigation unit and acquire a speed of the own vehicle 100 using a variation with time of the location of the own vehicle 100. In another alternative embodiment, the speed acquirer may acquire a location of the own vehicle 100 via communications described later and acquire a speed of the own vehicle 100 using a variation with time of the location of the own vehicle 100.

The braking device 12 is a frictional braking device and is used for heavy and light application of brakes. The braking device 12 includes an anti-lock braking system. The braking device 12 may include a regenerative braking device such as an electric motor, as well as the frictional braking device. The steering device 18 is configured to change the orientation of the own vehicle 100.

The camera 14 is configured to image forward of the own vehicle 100. In the present embodiment, the camera 14 may be a monocular camera or a stereo camera. The camera 14 may be a color or monochrome camera. In addition, the camera 14 may be a camera including wide-angle or zoom lenses. A plurality of cameras 14 configured as above may be provided to cover a large field of view. In addition, a rotating device may be provided to rotate an imaging direction of the camera 14.

The radar 15 is configured to emit electromagnetic waves or laser beams in the forward direction of the own vehicle 100 and receive their reflected waves, thereby detecting conditions ahead of the own vehicle 100. For example, a millimeter wave radar using millimeter waves or an infrared radar using infrared rays, or a light detection and ranging (LiDAR) radar using light of wavelengths shorter than wavelengths of the infrared rays. Of these types of radars, plural types of radars may be provided.

The transceiver 16 is a communication device enabling communications (V2X) between the own vehicle 100 and communication devices that are not mounted to the own vehicle 100. The communications include Vehicle-to-cellular-Network (V2N) communication to communicate with cell phones and smart phones via base stations, Vehicle-to-Vehicle (V2V) communication to communicate with communication devices mounted to the other vehicles, Vehicle-to-Roadside-Infrastructure (V2I) communication to communicate with communication devices installed along roads, and Vehicle-to-Pedestrian (V2P) communication to communicate with smart phones carried by pedestrians or bicycle riders. The term "V2X" is a general term for such V2N, V2V, V2I, and V2P. The transceiver 16 is configured to acquire information from the other communication devices via the V2X communications and transmit information about the own vehicle 100 to the other communication devices via the V2X communications. In an alternative embodiment, the transceiver 16 may include only a receiving function to receive information from the other communication devices via the V2X communications. In another alternative embodiment, the transceiver 16 may further be configured to receive information from the vehicle information and communication system (VICS) (registered trademark). Using VICS, the transceiver 16 is allowed to acquire information about traffic jams, traffic volumes, and whether a road of interest is a road with priority.

The microphone 17 is configured to acquire travel noise of vehicles other than the own vehicle 100. Preferably, the microphone 17 may be a directional microphone to acquire travel noise ahead of the own vehicle 100. Further, the microphone 17 may include a filter to acquire only travel noise.

The CPU 19 includes a collision avoidance controller 20 corresponding to a collision avoidance control apparatus. The collision avoidance controller 20 is configured to control the own vehicle 100 to avoid a collision with another object. The collision avoidance controller 20 includes a moving-object recognizer 21, an image analyzer 22, a surroundings recognizer 23, a trajectory determiner 24, a risk index calculator 25, a braking controller 26, and a steering controller 27. Functions of the collision avoidance controller 20, including functions of the moving-object recognizer 21, the image analyzer 22, the surroundings situation recognizer 23, the trajectory determiner 24, the risk index calculator 25, the braking controller 26, and the steering controller 27, are implemented by the CPU 19 executing computer programs. In an alternative embodiment, the collision avoidance controller 20 may be configured as a dedicated computer that is provided by forming a processor from one or more dedicated hardware logic circuits.

The moving-object recognizer 21 is configured to receive at least location information of a moving object via the transceiver 16 and recognize the presence of the moving object carrying the V2X-communication device, thereby recognizing a location and a speed of the moving object. The moving-object recognizer 21 is configured to acquire the speed of the moving object from the succession of locations of the moving object. The term "moving object" as used herein refers to a vehicle, a pedestrian, a bicycle or the like. In the case where the moving object is a pedestrian or a bicycle, the V2X-communication device is a smart phone carried by the pedestrian or a bicycle driver. In the case where the moving object is another vehicle that is not equipped with any V2X-communication device, the V2X communication device may be a smart phone carried by a driver or an occupant of the vehicle.

The image analyzer 22 is configured to analyze images captured by the camera 14 and determine whether there is a moving object in each image. The image analyzer 22 is further configured to analyze images captured by the camera 14 and determine whether there is an obstacle obstructing the view of the moving object, such as a wall or the like, in each image. The image analyzer 22 is still further configured to determine whether there is a road sign or a road marking in each image, and if determining that there is a road sign or a road marking, determine what type of road sign or road marking is in the image.

The surroundings recognizer 23 is configured to recognize surroundings of the own vehicle 100 using information about moving objects recognized by the object moving-object recognizer 21 and information about moving objects and traffic signs recognized using the camera 14, and information about moving objects recognized using the radar 16.

The trajectory determiner 24 is configured to estimate a future movement trajectory of a moving object using the location and the speed of the moving object. The trajectory determiner 24 is further configured to estimate a future movement trajectory of the own vehicle 100 using the speed of the own vehicle 100 and determine whether the moving object is likely to collide with the own vehicle 100.

The risk-index calculator 25 is configured to calculate a risk index for determining whether the own vehicle 100 is likely to collide with a moving object, using the information about the moving object acquired by the moving-object recognizer 21, a result of analysis of images captured by the camera 14, and surroundings of the own vehicle 100 recognized by the surroundings recognizer 23. The risk index will be described later.

The braking controller 26 is configured to control the braking device 12 in dependence upon the risk index. When the risk index is high, the braking controller 26 directs the braking device 12 to apply heavy braking. When the risk index is low, the braking controller 26 directs the braking device 12 to apply light braking. The steering controller 27 is configured to change the travel direction of the own vehicle 100 upon the braking controller 26 directing light braking.

Figure 2:
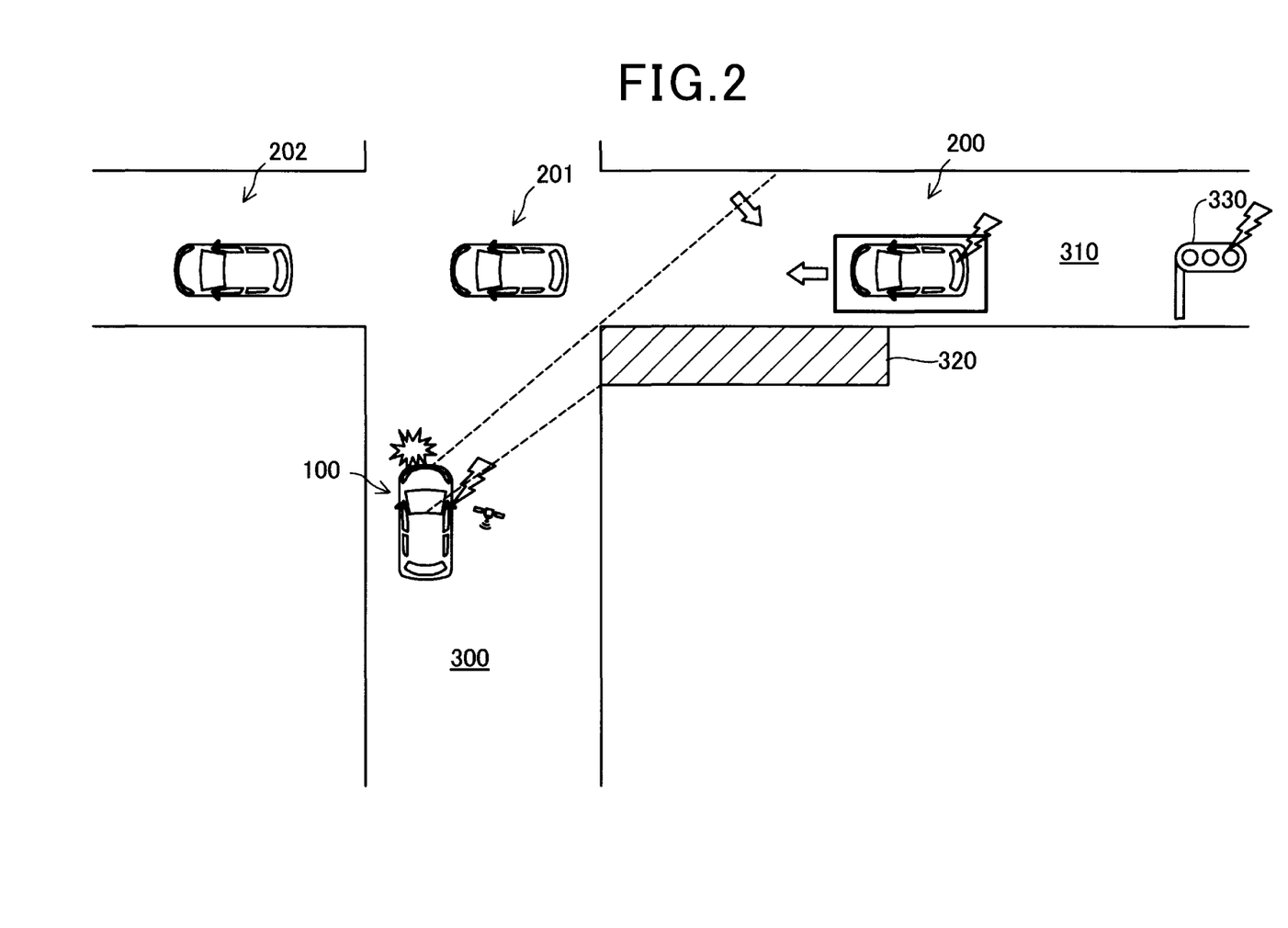
FIG. 2 is an example situation where collision avoidance control is performed.

FIG. 2 illustrates an example situation where collision avoidance control is to be performed. In the situation of FIG. 2, the own vehicle 100 is traveling on a road 300. There is a road 310 crossing the road 300 ahead of the own vehicle 100 in the travel direction. Other vehicles 200, 201, 202, which are moving objects, are traveling or moving on the road 310. The vehicle 201, which is passing the intersection, and the vehicle 202, which is traveling after having passed the intersection, are unlikely to collide with the own vehicle 100. The vehicle 200 has not passed the intersection. The vehicle 200 has been recognized by the moving-object recognizer 21 of the own vehicle 100, but its view is being obstructed by the wall 320. The vehicle 200 is traveling at a location where the vehicle 200 fails to be recognized by the camera 14 and the radar 16. In addition, there is a traffic light 330 behind the vehicle 200.

Figure 3:
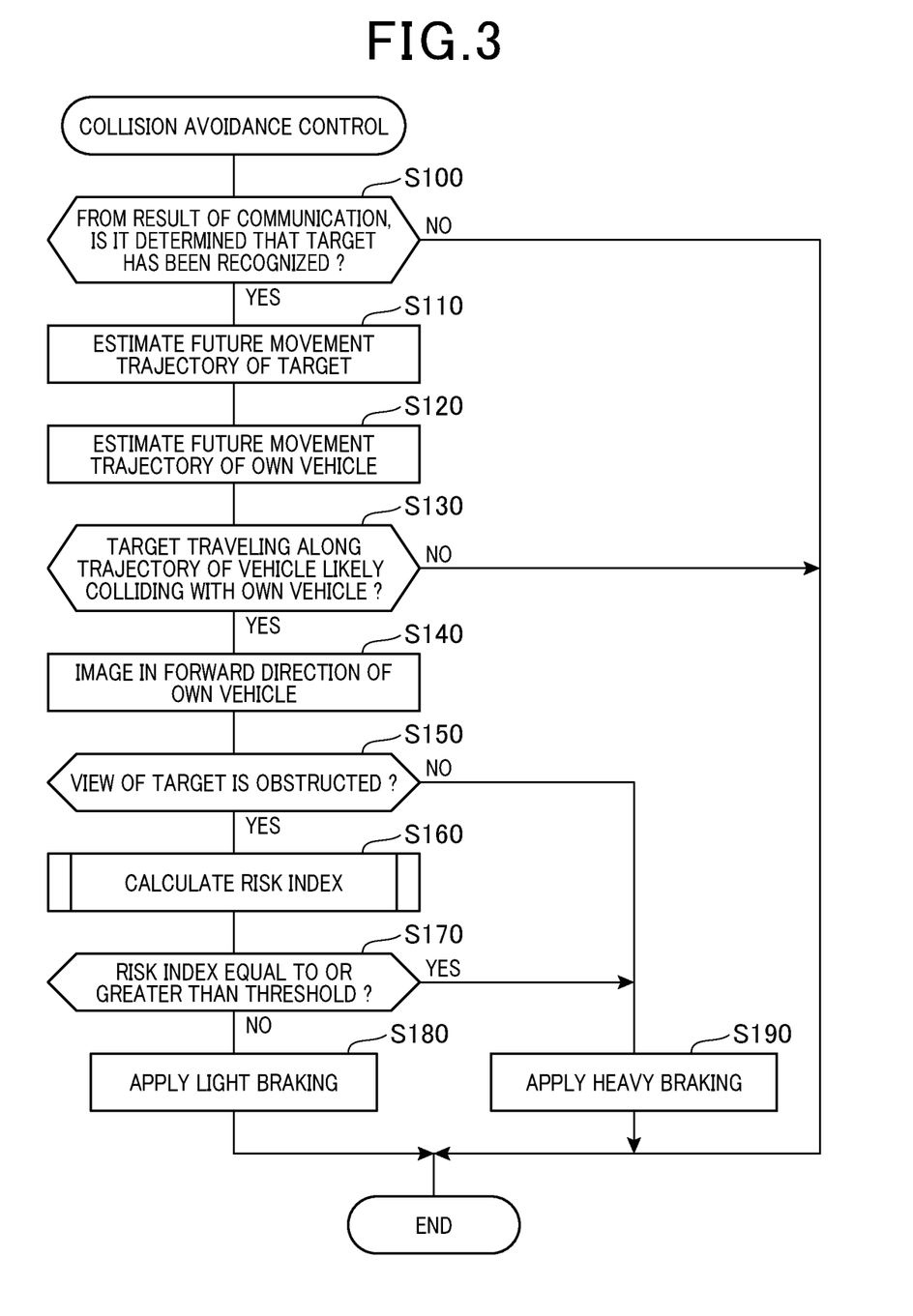
FIG. 3 is a flowchart of a collision avoidance control process performed by a collision avoidance controller after a moving-object recognizer of the collision avoidance controller has recognized a vehicle from a result of communication by a transceiver in the situation of FIG. 2.

FIG. 3 illustrates a flowchart of the collision avoidance control process performed by the collision avoidance controller 20 after the moving-object recognizer 21 of the collision avoidance controller 20 has recognized the vehicle 200 (as a target) in the situation of FIG. 2 from a result of V2X communication via the transceiver 16.

At step S100, the collision avoidance controller 20 determines whether the moving-object recognizer 21 has recognized the vehicle 200 from information received by the V2X transceiver 16. If the moving-object recognizer 21 has recognized the vehicle 200, then the process flow proceeds to step S110. Otherwise, the process flow ends.

At step S110, the trajectory determiner 24 of the collision avoidance controller 20 estimates, for example, a future movement trajectory of the vehicle 200 using the succession of locations of the vehicle 200 received via the transceiver 16.

At step S120, the trajectory determiner 24 acquires a speed of the own vehicle 100 from the speedometer 11 and calculates a future movement trajectory of the own vehicle 100.

At step S130, the trajectory determiner 24 determines, using the estimated future movement trajectory of the vehicle 200 and the calculated future movement trajectory of the own vehicle 100, whether the future movement trajectory of the vehicle 200 is a trajectory of a vehicle likely colliding with the own vehicle 100. The trajectory of a vehicle likely colliding with the own vehicle 100 refers to a trajectory along which a vehicle will or is likely to collide with the own vehicle 100 if they continue to travel at their present speeds. If the future movement trajectory of the vehicle 200 is a trajectory of a vehicle likely colliding with the own vehicle 100, the process flow proceeds to step S140. Otherwise, the process flow ends.

At step S140, the image analyzer 22 of the collision avoidance controller 20 causes the camera 14 to image in the forward direction of the own vehicle 100. At step S150, the image analyzer 22 determines whether the view of the vehicle 200 is obstructed by an obstacle. For example, the image analyzer 22 recognizes a position of the vehicle 200 in the image based on the current location of the own vehicle 100 and the current location of the vehicle 200. If the vehicle 200 fails to be recognized due to the presence of an obstacle, such as a wall or the like, at the position in the image, the image analyzer 22 determines that the view of the vehicle 200 is obstructed by the obstacle. If the image analyzer 22 fails to recognize the vehicle 200 due to obstruction by a wall or the like, the process flow proceeds to step S160. If the image analyzer 22 has successfully recognized the vehicle 200 in the image without its view being obstructed by a wall or the like, the process flow proceeds to step S190.

At step S190, the braking controller 26 of the collision avoidance controller 20 directs the braking device 12 to apply heavy braking. This is because, if the vehicle 200 is successfully recognized in the image without the view of the vehicle 200 being obstructed by a wall or the like, another vehicle following the own vehicle 100 is deemed to have recognized the vehicle 200 and a rear-end collision of the own vehicle 100 with the following vehicle is therefore less likely to occur even if heavy braking is applied. The term "heavy braking" as used herein refers to braking with the strength just before activation of the antilock brake system. The strongest braking force is reached just before activation of the antilock brake system. However, the movement trajectory of the own vehicle 100 when the braking device 12 is braking may be calculated, and if it is determined that the calculated movement trajectory of the own vehicle 100 and the movement trajectory of the vehicle 200 will not lead to a collision between the own vehicle 100 and the vehicle 200, the braking controller 26 may control the braking device 12 to apply a braking force sufficient to avoid a collision with the vehicle 200.

At step S160, the risk-index calculator 25 of the collision avoidance controller 20 calculates a risk index. A calculation process of the risk index performed by the risk-index calculator 25 will be described later.

At step S170, the braking controller 26 of the collision avoidance controller 20 determines whether the risk index is equal to or greater than a predetermined threshold. If the risk index is equal to or greater than the predetermined threshold, the process flow proceeds to step S190. At step S190, the braking controller 26 directs the braking device 12 to apply heavy braking. If the risk index is less than the predetermined threshold, the process flow proceeds to step S180. At step S180, the braking controller 26 directs the braking device 12 to apply light braking while avoiding a collision with the following vehicle. The term "light braking" as used herein refers to braking with less braking force than the braking force that activates the antilock brake system. The braking force during weak braking may be around 20% of the braking force that activates the antilock brake system.

Figure 4:
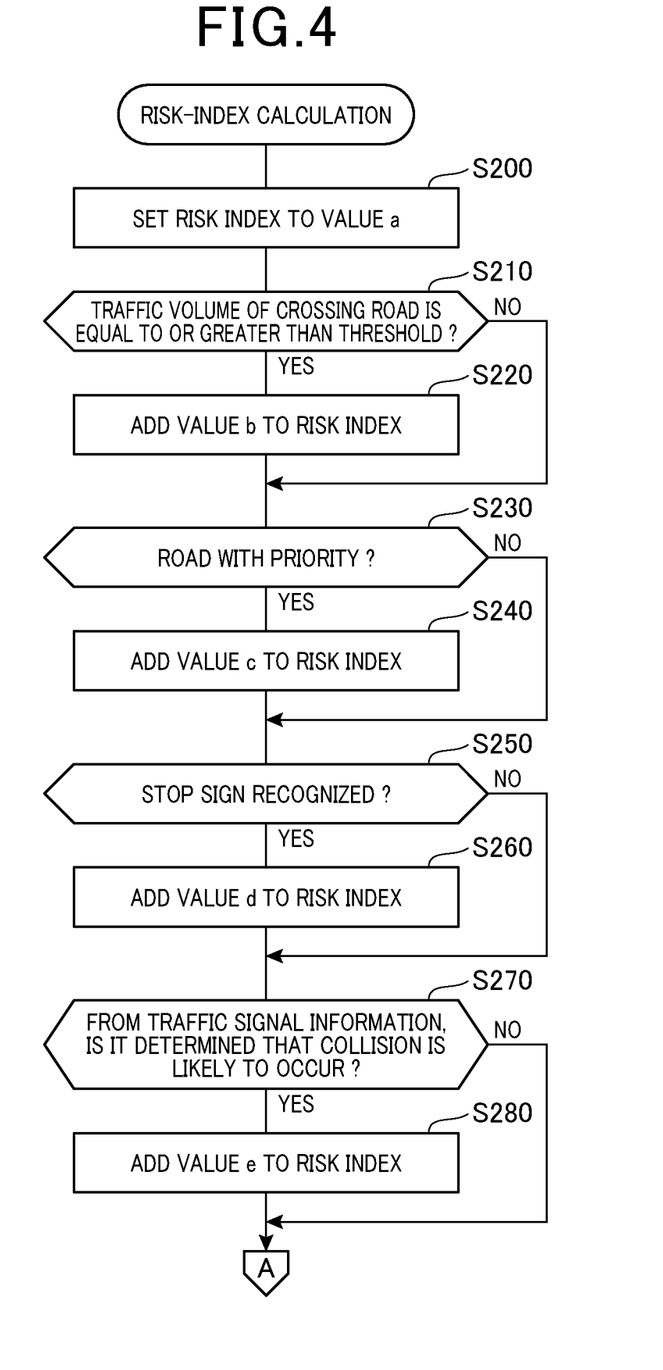
FIG. 4 is a flowchart of a former part of risk index calculation performed by a risk-index calculator.
Figure 5:
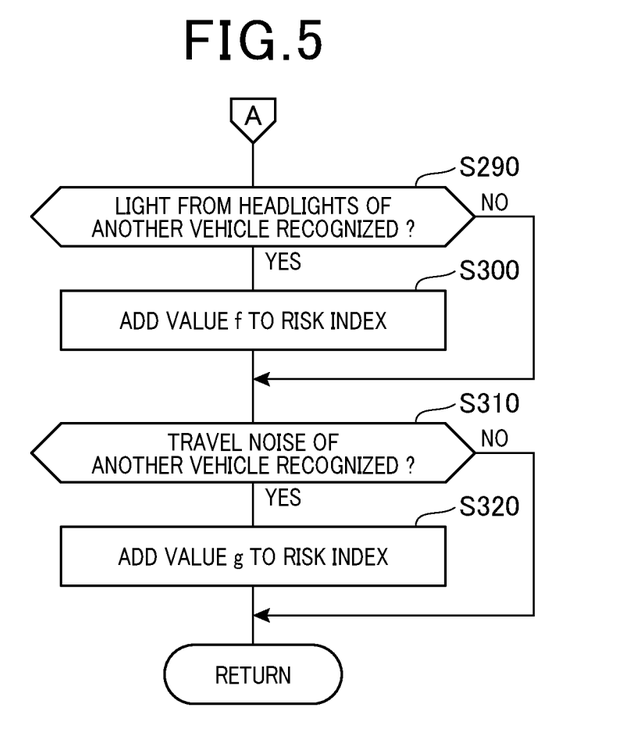
FIG. 5 is a flowchart of a latter part of risk index calculation performed by the risk-index calculator.

FIGS. 4 and 5 illustrate a flowchart of a risk-index calculation process performed by the risk-index calculator 25. At step S200, the risk index is set to a value a. This risk index value a is a value of the risk index when a vehicle 200, which has been recognized as traveling on a trajectory of a vehicle likely colliding with the own vehicle 100, fails to be recognized by the camera 14 due to the view of the vehicle 200 being obstructed.

At step S210, the risk-index calculator 25 determines whether a traffic volume of the road 310 crossing the road 300 that the own vehicle 100 is traveling on is equal to or greater than a threshold (the road 310 may herein be referred to as a crossing road). If the traffic volume of the road 310 is equal to or greater than the threshold, then the process flow proceeds to step S220. At step S220, the risk-index calculator 25 adds a value b to the risk index to increase the risk index, which is followed by step S230. If the traffic volume of the road 310 is less than the threshold, then the process flow proceeds directly to step S230. For example, the risk-index calculator 25 acquires the number of moving objects, including the vehicle 200 and other vehicles 201, 202, which travel on the road 310 within a predetermined time period from a result of communication by the transceiver 16, and determines the traffic volume of the road 310. In an alternative embodiment, the risk-index calculator 25 may receive, using the transceiver 16, traffic information of the road 310 from VICS, thereby determining the traffic volume of the road 310. In another alternative embodiment, the risk-index calculator 25 may cause the image analyzer 22 to analyze images captured by the camera 14 to acquire the number of vehicles that travel on the road 310 within the predetermined time period, thereby determining the traffic volume of the road 310. In still another alternative embodiment, the risk-index calculator 25 may acquire, using the radar 15, the number of vehicles that travel on the road 310 within the predetermined time period, thereby determining the traffic volume of the road 310.

At step S230, the risk-index calculator 25 determines whether the road 310 is a road with priority. If the road 310 is a road with priority, then the process flow proceeds to step S240. At step S240, the risk-index calculator 25 adds a value c to the risk index to increase the risk index, which is followed by step S250. If the road 310 is not a road with priority, then the process flow proceeds directly to step S250. For example, the risk-index calculator 25 causes the image analyzer 22 to analyze images captured by the camera 14 to recognize the presence or absence of a "GIVE WAY" or "YIELD" sign. If recognizing the "GIVE WAY" or "YIELD" sign, the risk-index calculator 25 may determine that the road 310 is a road with priority. In an alternative embodiment, the risk-index calculator 25 may use information acquired from VICS via the transceiver 16 to determine whether the road 310 is a road with priority.

At step S250, the risk-index calculator 25 causes the image analyzer 22 to analyze images captured by the camera 14 to detect the presence or absence of a regulatory sign, such as a "STOP" sign. If recognizing a regulatory sign, the risk-index calculator 25 adds a value d to the risk index to increase the risk index, which is followed by step S270. This is because it can be determined that the road 310 is a road with higher priority than the road 300. If recognizing no regulatory sign, then the process flow proceeds directly to step S270. The process flow may also proceed to step S260 if the risk-index calculator 25 recognizes, from a result of image analysis by the image analyzer 22, a "STOP" road marking on the road 300 even if failing to detect the "STOP" sign. The process flow may proceed to step S270. This is because the view of "STOP" sign may be obstructed by trees or the like and the "STOP" sign may thus fail to be recognized in the images captured by the camera 14. The risk-index calculator 25 may also increase the risk index if recognizing a crosswalk road marking on the road 300. In this manner, using information about a traffic sign or a road marking recognized from a result of analysis of images captured by the camera, the risk-index calculator 25 is able to determine priorities of roads to increase the risk index.

At step S270, the risk-index calculator 25 acquires a location of a traffic light 330 along the road 310 and the timing of signal changes of the traffic light 330 using the transceiver 16, and determines, taking into account the movement trajectory of the vehicle 200, the likelihood that the own vehicle 100 and the vehicle 200 will reach trajectories for collision. If the risk-index calculator 25 determines that the own vehicle 100 and the vehicle 200 are likely to reach trajectories for collision, then the process flow proceeds to step S280. At step S280, the risk-index calculator 25 adds a value e to the risk index, thereby increasing the risk index, which is followed by step S290. If the risk-index calculator 25 determines that the own vehicle 100 and the vehicle 200 are unlikely to reach trajectories for collision, the process flow proceeds directly to step S290.

At step S290, the risk-index calculator 25 causes the image analyzer 22 to analyze images captured by the camera 14 to recognize the presence or absence of light from the headlights of the vehicle 200 traveling on the road 310. If light from the headlights of the vehicle 200 is recognized, the process flow proceeds to step S300. At step S300, the risk-index calculator 25 adds a value f to the risk index, thereby increasing the risk index. If light from the headlights of the vehicle 200 is not recognized, the process flow proceeds directly to step S310. This is because, particularly during nighttime, light from the headlights of the vehicle 200 can be recognized even if the view of the vehicle 200 is obstructed by the wall 320 or the like. In an alternative embodiment, instead of using the camera 14, a sensor for detecting an amount of light in the forward direction of the own vehicle 100 may be provided to detect light from the headlights of the vehicle 200.

At step S310, the risk-index calculator 25 analyzes sound captured by the microphone 17 to determine whether travel noise of the vehicle 200 traveling on the road 310 is included in the sound. If travel noise of the vehicle 200 is included in the sound, the process flow proceeds to step S320. At step S320, the risk-index calculator 25 adds a value g to the risk index, thereby increasing the risk index. Thereafter, the process flow proceeds to step S170 of FIG. 3. If travel noise of the vehicle 200 traveling on the road 310 is not recognized in the sound, the process flow proceeds directly to step S170 of FIG. 3.

As described above, in the present embodiment, a collision avoidance measure responsive to the risk index is employed as follows. The collision avoidance controller 20 determines whether the risk index is equal to or greater than a predetermined threshold. If the risk index is equal to or greater than the predetermined threshold, the collision avoidance controller 20 directs the braking device 12 to apply heavy braking. If the risk index is less than the predetermined threshold, the collision avoidance controller 20 directs the braking device 12 to apply light braking while avoiding a collision with the following vehicle. This enables mitigation of a risk of an unexpected control operation of the own vehicle, such as rapid braking, unexpected to occupants of the own vehicle or the following vehicle, and a risk of a rear end collision caused by such an unexpected control operation of the own vehicle.

At steps S110 and S120 of FIG. 3, the trajectory determiner 24 may estimate a future movement trajectory of the vehicle 200 using the succession of locations of the vehicle 200 acquired via the receiver 16. The trajectory determiner 24 may calculate a movement trajectory of the own vehicle 100 by acquiring the succession of locations of the own vehicle 100 via the receiver 16 or by analyzing images captured by the camera 14. In this manner, the trajectory determiner 24 can acquire locations and movement trajectories of the own vehicle 100 and the vehicle 200.

In the present embodiment, to calculate the risk index, the risk-index calculator 25 makes a determination of the traffic volume of the crossing road 310 (step S210 of FIG. 4), a determination as to whether the crossing road 310 is a road with priority (step S230), a determination as to whether a stop sign has been recognized (step S250), a determination as to whether traffic signal information indicates that a collision is likely to occur (step S270), a determination as to whether light from headlights of another vehicle has been recognized (step S290), a determination as to whether travel noise of another vehicle has been recognized (step S310). This enables calculation of the risk index in a finer manner. The risk-index calculator 25 may not make all of these determinations, but may make some of them. The risk-index calculator 25 may increase the risk index in other cases than the cases described above. For example, the risk-index calculator 25 may increase the risk index if determining, from sound captured by the microphone 17 or information acquired by the transceiver 16, that there is an emergency vehicle traveling on the crossing road 310.

As described above regarding FIG. 3, at step S100, the process flow ends if the moving-object recognizer 21 does not recognize the vehicle 200 using the V2X transceiver 16. However, even if the moving-object recognizer 21 does not recognize the vehicle 200 using the V2X transceiver 16, the collision avoidance controller 20 may direct the braking device 12 to apply braking to avoid a collision if the collision avoidance controller 20 recognizes, using the camera 14 or the radar 15, a moving object that is likely to collide with the own vehicle 100.

As described above regarding FIG. 3, the braking controller 26 applies heavy braking or light braking in dependence upon whether the risk index is equal to or greater than (≥) the threshold or less than (<) the threshold. The braking controller 26 may control the braking strength in a finer manner. The braking controller 26 may continuously change the braking strength in accordance with the risk index.

In the above embodiment, avoidance of a collision with the vehicle 200 traveling on the road 310 as a moving object has been described as an example. In an alternative embodiment, the moving object may be a pedestrian or a bicycle rider other than the vehicle 200. Assuming that the pedestrian or the bicycle rider is carrying a smart phone, the pedestrian or the bicycle rider, even if his/her view is obstructed by an obstacle, can be recognized by the transceiver 16 communicating with the smart phone (V2P), which enables collision avoidance as described in the above embodiment.

In the above embodiment, the view of the vehicle 200 is obstructed by the wall 320 as an example of an obstacle. In an alternative embodiment, the obstacle may include, other than the wall 320, a building, a tree, a signboard, a parked vehicle, or a large-sized vehicle traveling on the same road 300 as the own vehicle 100 is traveling on. In still another alternative embodiment, the vehicle 200 may fail to be recognized due to backlight, a failure of the camera 14, mist, snowy weather, smoke or the like. In another alternative embodiment, the vehicle 200 may fail to be recognized due to moving out of a parking spot or merging from a three-way intersection.

In the above embodiment, the collision avoidance measure includes increasing the braking force when the risk index is high and decreasing the braking force when the risk index is low. In an alternative embodiment, the collision avoidance measure may include providing to another moving object, using V2V communication or horn, a notification that the own vehicle is likely to collide with the moving object. If the road that the own vehicle 100 is traveling on is a multi-lane road and a lane change allows a collision to be avoided, the collision avoidance measure may include braking the own vehicle 100 or making a lane change instead of braking the own vehicle 100.

Preferably, the values a to g to be added to the risk index, and the various thresholds may be determined appropriately by experiment or the like.

Modification

Figure 6:
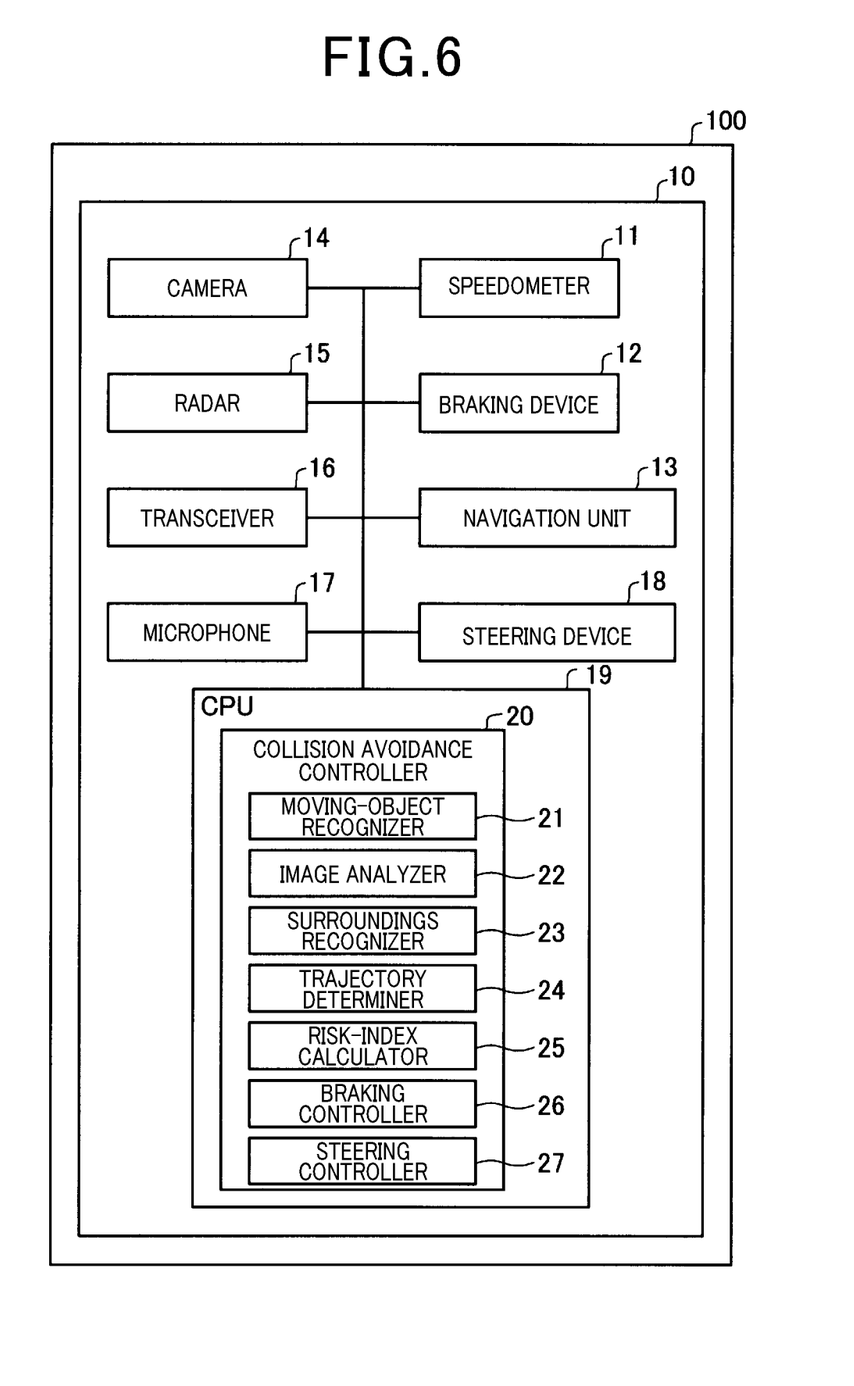
FIG. 6 is a schematic block diagram of an own vehicle including a collision avoidance apparatus according to a modification to the embodiment of FIG. 1.

FIG. 6 illustrates a schematic block diagram of the collision avoidance apparatus 10 according to a modification to the above embodiment. Unlike the above embodiment, the collision avoidance apparatus 10 further includes a navigation unit 13. The navigation unit 13 provides route guidance from the location of the own vehicle 100 to a destination. The navigation unit includes map data and receives signals from satellites of the global navigation satellite system (GNSS) to determine the location of the own vehicle 100. The navigation unit 13 is operable to receive radio waves from radio-wave beacons installed along the road, radio waves from cell-phone base stations, and radio waves from Wi-Fi base stations, as well as the signals from the satellites of the GNSS, and determine the location of the own vehicle 100 using these radio waves. The risk-index calculator 25 may acquire, using the map data of the navigation unit 13, the priority of the road 300 that the own vehicle 100 is traveling on and the priority of the road 310 crossing the road 300, and determine whether the road 310 is a road with higher priority. For example, if determining, from the map data of the navigation unit 13, that there is a stop sign at the intersection between the road 310 and the road 300, the risk-index calculator 25 may determine that the road 310 crossing the road 300 is a road with priority. Also, in such a modification where the collision avoidance apparatus 10 includes the navigation unit, the collision avoidance controller 20 may determine whether the risk index is equal to or greater than the predetermined threshold. If determining that the risk index is equal to or greater than the predetermined threshold, the collision avoidance controller 20 may direct the baking device 12 to apply heavy braking. If determining that the risk index is less than the predetermined threshold, the collision avoidance controller 20 may direct the baking device 12 to apply light braking. In such a manner, the collision avoidance measure responsive to the risk index is employed. This enables mitigation of a risk of an unexpected control operation of the own vehicle, such as rapid braking, unexpected to occupants of the own vehicle or the following vehicle, and a risk of a rear end collision caused by such an unexpected control operation of the own vehicle.

The present disclosure is not limited to any of the embodiments, the examples and the modifications described above but may be implemented by a diversity of other configurations without departing from the scope of the disclosure. For example, the technical features of the embodiments, examples or modifications corresponding to the technical features of the respective aspects may be replaced or combined appropriately, in order to solve part or all of the issues described above or in order to achieve part or all of the advantages described above. Any of the technical features may be omitted appropriately unless the technical feature is described as essential herein.

The present disclosure is summarized as follows.

One aspect of the present disclosure provides a collision avoidance apparatus for a vehicle, including: a receiver configured to receive at least location information of a moving object moving on a crossing road that is a road crossing a road that the vehicle is traveling on; a camera configured to image in a travel direction of the vehicle; a speed acquirer configured to acquire a speed of the vehicle; a braking device configured to brake the vehicle; and a collision avoidance controller. The collision avoidance controller is configured to calculate a movement trajectory of the moving object from a succession of locations of the moving object received by the receiver, calculate a movement trajectory of the vehicle using the speed of the vehicle acquired by the speed acquirer, determine, using the movement trajectory of the moving object and the movement trajectory of the vehicle, whether the movement trajectory of the moving object is a trajectory of a moving object likely colliding with the vehicle, and in response to determining that the movement trajectory of the moving object is a trajectory of a moving object likely colliding with the vehicle and that the moving object fails to be recognized by the camera due to a view of the moving object being obstructed, calculate a risk index for determining a collision avoidance measure and employ the collision avoidance measure in dependence upon the risk index. With this configuration, the collision avoidance controller causes the braking device to apply rapid braking as a collision avoidance measure when the risk index is high and thus the likelihood of collision is high. The collision avoidance controller causes the braking device to apply gentle braking as a collision avoidance measure when the risk index is low and thus the likelihood of collision is low. That is, rapid braking is applied when the likelihood of collision is high, which enables mitigation of a risk of an unexpected control operation of the vehicle, such as rapid braking, unexpected to occupants of the vehicle or the following vehicle.

In the collision avoidance apparatus according to the above aspect, the collision avoidance controller may be configured to, in response to the risk index being equal to or greater than a predetermined threshold, control the braking device to apply increased braking force as the collision avoidance measure as compared to a case where the risk index is less than the predetermined threshold. With this configuration, rapid braking is applied as a collision avoidance measure when the risk index is high and thus the likelihood of collision is high, and gentle braking is applied as a collision avoidance measure when the risk index is low and thus the likelihood of collision is low. This enables collision avoidance in dependence upon the risk index.

In the collision avoidance apparatus according to the above aspect, the collision avoidance controller may be configured to, in response to a traffic volume of the crossing road being equal to or greater than a predetermined threshold, increase the risk index as compared to a case where the traffic volume of the crossing road is less than the predetermined threshold. With this configuration, if the traffic volume of the crossing road is equal to or greater than the predetermined threshold, the risk index is increased, which can facilitate collision avoidance.

In the collision avoidance apparatus according to the above aspect, the collision avoidance controller may be configured to determine the traffic volume of the crossing road using at least one of a traffic volume of the crossing road acquired from traffic information received by the receiver and a traffic volume of the crossing road acquired by analyzing images captured by the camera. With this configuration, the traffic volume of the crossing road can readily be determined.

The collision avoidance apparatus according to the above aspect further includes a radar. The collision avoidance controller may be configured to determine the traffic volume of the crossing road using a traffic volume of the crossing road acquired by analyzing signals received by the radar. With this configuration, the traffic volume of the crossing road can readily be determined.

In the collision avoidance apparatus according to the above aspect, the collision avoidance controller may be configured to acquire priorities of the road that the vehicle is traveling on and the road that the moving object is moving on, and in response to the priority of the road that the moving object is moving on being higher than the priority of the road that the vehicle is traveling on, increase the risk index as compared to a case where the priority of the road that the moving object is moving on is lower than the priority of the road that the vehicle is traveling on. With this configuration, since the vehicle is obligated to stop if the priority of the road that the moving object is moving on is higher than the priority of the road that the vehicle is traveling on, increasing the risk index can facilitate collision avoidance.

The collision avoidance apparatus according to the above aspect further includes a navigation unit. The collision avoidance controller may be configured to acquire, using the navigation unit, the priorities of the road that the vehicle is traveling on and the road that the moving object is moving on. With this configuration, road priorities can readily be acquired. In the collision avoidance apparatus according to the above aspect, the collision avoidance controller may be configured to acquire the priorities of the road that the vehicle is traveling on and the road that the moving object is moving on, using information about a road sign or a road marking acquired by analyzing images captured by the camera. With this configuration, road priorities can readily be acquired.

In the collision avoidance apparatus according to the above aspect, the collision avoidance controller may be configured to, based on information received by the receiver about traffic lights installed along the crossing road and the succession of locations of the moving object, and the location and the speed of the vehicle, determine whether the vehicle and the moving object are likely to reach trajectories for collision, and in response to determining that the vehicle and the moving object are likely to reach the trajectories for collision, increase the risk index as compared to a case where it is not determined that the vehicle and the moving object are likely to reach the trajectories for collision. With this configuration, the collision avoidance controller increases the risk index if determining that the moving object and the vehicle are likely to collide with each other, which can facilitate collision avoidance.

In the collision avoidance apparatus according to the above aspect, the collision avoidance controller may be configured to, in response to recognizing light from a headlight of the moving object from a result of analysis of images captured by the camera, increase the risk index as compared to a case where the light from the headlight of the moving object is not recognized. With this configuration, the collision avoidance controller increases the risk index if recognizing light from a headlight of the moving object, which can facilitate collision avoidance, particularly during nighttime.

The collision avoidance apparatus according to the above aspect further includes a microphone configured to acquire travel noise of vehicles other than the vehicle. The collision avoidance controller may be configured to, in response to determining that travel noise of the moving object is included in the travel noise of vehicles other than the vehicle, increase the risk index as compared to a case where it is not determined that the travel noise of the moving object is included in the travel noise of vehicles other than the vehicle. With this configuration, the collision avoidance controller is allowed to recognize the presence of the moving object whose view is obstructed by an obstacle from the travel noise of the moving object. If recognizing the presence of the moving object, the collision avoidance controller increases the index, which can facilitate collision avoidance.

Another aspect of the present disclosure provides a collision avoidance control apparatus for a vehicle, connected communicably to a receiver configured to acquire location information of a moving object that is moving on a road crossing a road which the vehicle is traveling on and a camera configured to image in a travel direction of the vehicle. The collision avoidance control apparatus is configured to, in response to a predefined condition being met, cause a braking device mounted to the vehicle to perform collision avoidance control. The collision avoidance control apparatus is further configured to: calculate a likelihood of collision between the moving object and the vehicle based on the location information of the moving object received by the receiver; determine, using the camera, whether the moving object has been recognized; and in response to determining that the moving object has not been recognized despite the calculated likelihood of collision between the moving object and the vehicle being greater than a predetermined value, change the predefined condition so as to facilitate activation of collision avoidance control by the braking device.

With this configuration, if the moving object fails to be recognized despite a high likelihood of collision between the moving object and the vehicle, activation of collision avoidance control by the braking device is facilitated. This may be less prone to occurrence of an unexpected control operation of the vehicle, such as rapid braking after recognition of the moving object by using the camera. The predefined condition corresponds to a condition that the risk index is equal to or greater than a predetermined threshold. Changing the predefined condition so as to facilitate activation of collision avoidance control by the braking device corresponds to increasing the risk index as described regarding the flowchart of FIG. 4 regarding the calculation of the risk index.

What is claimed is:

1. A collision avoidance apparatus for a vehicle, comprising:
   a receiver configured to receive at least location information of a moving object moving on a crossing road that is a road crossing a road that the vehicle is traveling on;
   a camera configured to image in a travel direction of the vehicle;
   a speed acquirer configured to acquire a speed of the vehicle;
   a braking device configured to brake the vehicle, the braking device configured to apply a first braking force and a second braking force, the first braking force being greater than the second braking force; and
   a collision avoidance controller configured to
      calculate a movement trajectory of the moving object from a succession of locations of the moving object received by the receiver,
      calculate a movement trajectory of the vehicle using the speed of the vehicle acquired by the speed acquirer,
      determine, using the movement trajectory of the moving object and the movement trajectory of the vehicle, whether the movement trajectory of the moving object is a trajectory of a moving object that is likely to collide with the vehicle,
      for a state in which the movement trajectory of the moving object is likely to collide with the vehicle, determine whether a view of the moving object by the camera is obstructed by an obstacle,
      in response to determining that the view of the moving object by the camera is not obstructed by the obstacle, control the braking device to apply the first braking force,
      in response to determining that the view of the moving object by the camera is obstructed by the obstacle, calculate a risk index for determining a collision avoidance measure, the risk index calculated by summing of a plurality of risk values,
      compare the risk index to each of a predetermined first threshold and a predetermined second threshold that is less than the predetermined first threshold,
      in response to determining that the risk index is greater than or equal to the predetermined first threshold, control the braking device to apply the first braking force, and
      in response to determining that the risk index is less than the predetermined first threshold and greater than or equal to the predetermined second threshold, control the braking device to apply the second braking force.

2. The collision avoidance apparatus according to claim 1, wherein
   the collision avoidance controller is configured to, in response to a traffic volume of the crossing road being equal to or greater than a predetermined threshold, increase the risk index as compared to a case where the traffic volume of the crossing road is less than the predetermined threshold.

3. The collision avoidance apparatus according to claim 2, wherein
   the collision avoidance controller is configured to determine the traffic volume of the crossing road using at least one of a traffic volume of the crossing road acquired from traffic information received by the receiver and a traffic volume of the crossing road acquired by analyzing images captured by the camera.

4. The collision avoidance apparatus according to claim 2, further comprising a radar, wherein
   the collision avoidance controller is configured to determine the traffic volume of the crossing road using a traffic volume of the crossing road acquired by analyzing signals received by the radar.

5. The collision avoidance apparatus according to claim 2, wherein
   the collision avoidance controller is configured to acquire priorities of the road that the vehicle is traveling on and the road that the moving object is moving on, and in response to the priority of the road that the moving object is moving on being higher than the priority of the road that the vehicle is traveling on, increase the risk index as compared to a case where the priority of the road that the moving object is moving on is lower than the priority of the road that the vehicle is traveling on.

6. The collision avoidance apparatus according to claim 5, further comprising a navigation unit, wherein
   the collision avoidance controller is configured to acquire, using the navigation unit, the priorities of the road that the vehicle is traveling on and the road that the moving object is moving on.

7. The collision avoidance apparatus according to claim 5, wherein
   the collision avoidance controller is configured to acquire the priorities of the road that the vehicle is traveling on and the road that the moving object is moving on, using information about a road sign or a road marking acquired by analyzing images captured by the camera.

8. The collision avoidance apparatus according to claim 2, wherein
   the collision avoidance controller is configured to, based on information received by the receiver about traffic lights installed along the crossing road and the succession of locations of the moving object, and the location and the speed of the vehicle, determine whether the vehicle and the moving object are likely to reach trajectories for collision, and in response to determining that the vehicle and the moving object are likely to reach the trajectories for collision, increase the risk index as compared to a case where it is not determined that the vehicle and the moving object are likely to reach the trajectories for collision.

9. The collision avoidance apparatus according to claim 2, wherein
   the collision avoidance controller is configured to, in response to recognizing light from a headlight of the moving object from a result of analysis of images captured by the camera, increase the risk index as compared to a case where the light from the headlight of the moving object is not recognized.

10. The collision avoidance apparatus according to claim 2, further comprising a microphone configured to acquire travel noise of vehicles other than the vehicle, wherein
    the collision avoidance controller is configured to, in response to determining that travel noise of the moving object is included in the travel noise of vehicles other than the vehicle, increase the risk index as compared to a case where it is not determined that the travel noise of the moving object is included in the travel noise of vehicles other than the vehicle.

11. A collision avoidance system for a vehicle, the vehicle including a receiver configured to receive at least location information of a moving object moving on a crossing road that is a road crossing a road that the vehicle is traveling on, a camera configured to image in a travel direction of the vehicle, a speed acquirer configured to acquire a speed of the vehicle, and a braking device configured to brake the vehicle, the braking device configured to apply a first braking force and a second braking force, the first braking force being greater than the second braking force, the collision avoidance system comprising:

- a processor;
- a non-transitory computer-readable storage medium; and
- a set of computer-executable instructions stored on the non-transitory computer-readable storage medium that cause the processor to:
  - calculate a movement trajectory of the moving object from a succession of locations of the moving object received by the receiver,
  - calculate a movement trajectory of the vehicle using the speed of the vehicle acquired by the speed acquirer,
  - determine, using the movement trajectory of the moving object and the movement trajectory of the vehicle, whether the movement trajectory of the moving object is a trajectory of a moving object that is likely to collide with the vehicle,
  - for a state in which the movement trajectory of the moving object is likely to collide with the vehicle, determine whether a view of the moving object by the camera is obstructed by an obstacle,
  - in response to determining that the view of the moving object by the camera is not obstructed by the obstacle, control the braking device to apply the first braking force,
  - in response to determining that the view of the moving object by the camera is obstructed by the obstacle, calculate a risk index for determining a collision avoidance measure, the risk index calculated by summing of a plurality of risk values,
  - compare the risk index to each of a predetermined first threshold and a predetermined second threshold that is less than the predetermined first threshold,
  - in response to determining that the risk index is greater than or equal to the predetermined first threshold, control the braking device to apply the first braking force, and
  - in response to determining that the risk index is less than the predetermined first threshold and greater than or equal to the predetermined second threshold, control the braking device to apply the second braking force.

12. A method for a vehicle to perform collision avoidance, the vehicle including a receiver configured to receive at least location information of a moving object moving on a crossing road that is a road crossing a road that the vehicle is traveling on, a camera configured to image in a travel direction of the vehicle, a speed acquirer configured to acquire a speed of the vehicle, and a braking device configured to brake the vehicle, the braking device configured to apply a first braking force and a second braking force, the first braking force being greater than the second braking force, the method comprising:

- calculating a movement trajectory of the moving object from a succession of locations of the moving object received by the receiver,
- calculating a movement trajectory of the vehicle using the speed of the vehicle acquired by the speed acquirer,
- determining, using the movement trajectory of the moving object and the movement trajectory of the vehicle, whether the movement trajectory of the moving object is a trajectory of a moving object that is likely to collide with the vehicle,
- for a state in which the movement trajectory of the moving object is likely to collide with the vehicle, determining whether a view of the moving object by the camera is obstructed by an obstacle,
- in response to determining that the view of the moving object by the camera is obstructed by the obstacle, calculating a risk index for determining a collision avoidance measure, the risk index calculated by summing of a plurality of risk values,
- comparing the risk index to each of a predetermined first threshold and a predetermined second threshold that is less than the predetermined first threshold, and
- in response to determining that the risk index is less than the predetermined first threshold and greater than or equal to the predetermined second threshold, controlling the braking device to apply the second braking force.

13. The method according to claim 12, wherein
in response to determining that the view of the moving object by the camera is not obstructed by the obstacle, controlling the braking device to apply the first braking force.

14. The method according to claim 12, wherein
in response to determining that the risk index is greater than or equal to the predetermined first threshold, controlling the braking device to apply the first braking force.

* * * * *